United States Patent [19]

Hernandez

[11] 4,289,671
[45] Sep. 15, 1981

[54] COATING COMPOSITION FOR DRAWING AND IRONING STEEL CONTAINERS

[75] Inventor: Pablo M. Hernandez, Waukegan, Ill.

[73] Assignee: S. C. Johnson & Son, Inc., Racine, Wis.

[21] Appl. No.: 156,148

[22] Filed: Jun. 3, 1980

[51] Int. Cl.³ .............................................. C08L 91/00
[52] U.S. Cl. ......................... 260/28.5 AV; 260/28.5 R
[58] Field of Search ................... 260/28.5 AV, 28.5 R

[56] References Cited

U.S. PATENT DOCUMENTS

| | | | |
|---|---|---|---|
| 3,835,078 | 9/1974 | Zdanowski | 260/28.5 AV |
| 3,929,938 | 12/1975 | White et al. | 260/28.5 AV |
| 4,046,726 | 9/1977 | Meiner et al. | 260/28.5 AV |

*Primary Examiner*—Melvyn I. Marquis

[57] ABSTRACT

An improved, aqueous coating composition for use as a sacrificial lubricating coating, for drawing and ironing sheet steel to form beverage containers comprising molybendum disulfide, an aqueous low molecular weight styrene containing resin, a wax emulsion, a high molecular weight acrylic polymer, a zinc cross-linking agent, a coalescent solvent, and water.

3 Claims, No Drawings

COATING COMPOSITION FOR DRAWING AND IRONING STEEL CONTAINERS

BACKGROUND OF THE INVENTION

This invention relates to a coating composition for use in a steel drawing and ironing process. More particularly, this invention relates to a alkali soluble removable coating composition which can be used to successfully deep draw beverage containers from tin-free steel.

Beverage containers such as soda and beer cans have been formed by drawing and ironing steel or aluminum to form the beverage container. However, this drawing and ironing process places great stress on the metal to be drawn and ironed which has lead to the requirement that a lubricant composition be coated on the metal surface prior to the can forming operation. For steel cans, this lubricant composition has been a tin coating which was applied to the sheet steel at the mill. This tin coating is a sacrificial coating which allows the steel to be successfully drawn. There is no continuous tin coating after the drawing and ironing operation is completed. Due to the prices of tin, the use of tin as a sacrificial coating for drawing and ironing steel beverage containers has become impractical, and a search has been conducted for a removable coating which can be easily and simply applied to black plate steel to allow the same to be drawn and ironed into beverage containers.

Leon Lewis, from U.S. Steel, has discovered a removable coating composition and a method for applying this coating to black plate steel, to enable the same to be successfully drawn and ironed. This composition comprises approximately 28% molybendum disulfide, approximately 58% of an aqueous floor polish composition, and approximately 14% of a wax emulsion drawing compound. This composition, although it allows cans to be drawn and ironed, has substantial coating and application problems and also is not stabile and tends to separate unless it is continuously stirred.

BRIEF DESCRIPTION OF THE INVENTION

The present invention is directed to a storage table aqueous sacrificial coating composition for use in the drawing and ironing of steel beverage containers comprising about 10 to 35% molybendum disulfide, about 4 to 7% of a low molecular weight resin, about 10 to 25% by weight of a wax emulsion, about 3 to 7% by weight of a high molecular weight acrylic polymer, about 1 to 5% solvent, about 0.1 to 0.25% of a water soluble zinc containing salt, and the balance of the composition containing water.

OBJECTS AND ADVANTAGES

It is therefore the primary object of the present invention to provide an improved coating composition for use in drawing and ironing steel containers.

It is a further object of the present invention to provide an aqueous sacrificial coating composition which is easily removable after drawing and ironing a steel container.

It is a still further object of the present invention to provide a lubricating composition which can be coated on sheet steel so that the same may be drawn and ironed into beverage containers.

Still further objects and advantages of the composition of the present invention will become more apparent from the following, more detailed, description thereof.

DETAILED DESCRIPTION OF THE INVENTION

The present invention relates to an improved aqueous sacrificial coating composition for use in drawing and ironing steel containers comprising from about 10 to 35% by weight of molybendum disulfide; from about 4 to 7% be weight of a low molecular weight resin having a monomer content of from about 25 to 35% acrylic acid, and about 65 to 75% of a styrene monomer selected from the group consisting of styrene, alpha-methyl styrene, and mixtures thereof; from about 10 to 25% by weight of an aqueous wax emulsion having a non-volatile content of from 15 to 25%; from about 3 to 7% by weight of a high molecular weight acrylic polymer comprising from about 25 to 60% of a styrene monomer selected from the group consisting of styrene, alpha-methyl styrene, or mixtures thereof, from about 30 to 50% by weight of an ester selected from methyl methacrylate, methyl acrylate, ethyl acrylate, ethyl methacrylate, butyl acrylate, and mixtures thereof, and from about 10 to 25% of an acid selected from acrylic acid or methacrylic acid; from about 1 to 5% by weight of a solvent selected from the group consisting of diethylene glycol monoethyl ether, diethylene glycol monobutyl ether, dipropylene glycol monomethyl ether, dipropylene glycol monoethyl ether, and mixtures thereof; from about 0.1 to 0.25% of a water soluble zinc containing salt, and from about 35 to 55% by weight water.

The composition of the present invention includes from about 10 to 35% by weight molybendum disulfide. Molybendum disulfide is a well known lubricating compound. The molybendum disulfide is the primary lubricant in the composition of the present invention giving both dry and extreme pressure lubricating properties to the composition. However, the molybendum disulfide must be dispersed throughout the composition, so that a thin, uniform coating of this material can be applied to the steel plate. If a uniform coating of the molybendum disulfide is not deposited on the steel prior to drawing, the drawn containers may not be uniformly produced. It is preferred that from about 15 to 30% by weight molybendum disulfide be utilized.

The composition of the present invention also includes from about 4 to 7% by weight of a low molecular weight resin, having a monomer content of from about 25 to 35% acrylic acid, and from about 65 to 75% of a styrene monomer selected from the group consisting of styrene, alpha-methyl styrene, or mixtures thereof. The resin functions to suspend the solid lubricating agent, the molybendum disulfide, in the formulation. The resin also aids in the formation of an impervious polymer film on the coated steel and adds some alkaline sensitivity to the film to provide removability. In amounts above 25% the resulting film is too water sensitive while amounts below 10% do not properly suspend the molybendum disulfide. Examples of suitable low molecular weight resins are those having a monomer content of 32% acrylic acid, 31% styrene, and 37% alpha-methyl styrene; 67% styrene and 33% acrylic acid, 72% styrene, 28% acrylic acid. It is preferred to utilize resins having a number average molecular weight of from 2,500 to 5,000. It is preferred to utilize from about 5 to 7% by weight of a low molecular weight resin.

The composition of the present invention also includes from about 10 to 25% by weight of an aqueous wax emulsion. Aqueous wax emulsions typically have a solids content, or a non-volatiles content of from about 15 to 25% by weight. These emulsions are typically prepared, utilizing either anionic, nonionic, or combinations of anionic and nonionic surfactants, along with both synthetic and natural waxes. The wax emulsion acts as a boundary lubricant giving secondary lubricating properties to the composition. The wax emulsion also has a plasticizing effect on the polymer film keeping the film from being too brittle. Brittle films would not provide proper adhesion of the lubricant to the steel during the drawing and ironing operation. At wax contents below 10% the resulting coating becomes too brittle, while above 25% no increased lubricating property results. Typical wax emulsions include wax emulsions of polyethylene waxes, Hoechst waxes, Fischer-Tropsch waxes, and other synthetic waxes, as well as emulsions of natural waxes such as Carnauba, Montan, Candelilla, and Paraffin waxes. It is preferred to utilize from about 10 to 15% by weight of a wax emulsion having a solids content of from about 15 to 20% non-volatiles.

The composition of the present invention also includes from about 3 to 7% by weight of a high molecular weight acrylic polymer. High moleculate acrylic polymers have a molecular weight MW, typically in excess of 200,000. These materials are formed having a monomer content of from about 25 to 50% of a styrene-type monomer selected from the group consisting of styrene, alpha-methyl styrene and mixtures thereof, from about 30 to 50% by weight of an ester selected from methyl methacrylate, methyl acrylate, ethyl acrylate, ethyl methacrylate, butyl acrylate and mixtures thereof, and from about 10 to 25% by weight of an acid selected from the group consisting of acrylic acid or methacrylic acid. Examples of typical polymers include 20% alpha-methyl styrene, 30% styrene, 40% ethyl acrylate, 10% methacrylic acid, 12% alpha-methyl styrene, 35% styrene, 7% methyl methacrylate, 35% butyl acrylate, 13% methacrylic acid; 55% styrene, 25% butyl acrylate, 20% methacrylic acid, etc. It is preferred to utilize from about 3 to 5% by weight of high molecular weight resin. The high molecular weight polymer is the primary film former, forming a water insensitive film when dried in combination with the zinc cross-linking agent. This material, however, is easily removed with alkaline cleaner. In amounts below 10%, poor adhesion results, while above 25%, the resulting films are too water insensitive.

The composition also includes from about 1 to 5% by weight of the solvent. These solvents are used primarily as coalescing agents for the pigment and polymer, and help to speed drying of the film. Suitable solvents include diethylene glycol monoethyl ether, diethylene glycol monobutyl ether, dipropylene glycol monomethyl ether, dipropylene glycol monoethyl ether. At amounts below 1% the films require too long to properly dry for a high speed industrial application while at amounts in excess of 5% the resulting films are too soft. It is preferred to utilize from about 1 to 3% by weight of a solvent in a composition.

The compositions of the present invention also include a small percentage, from about 0.1 to 0.25% of a water soluble zinc and containing salt. This zinc salt can be substantially any water soluble zinc containing material which will release zinc cation to the aqueous system. For convenience, it is preferred to use a complex zinc salt, such as zinc ammonium carbonate, as this complex zinc salt readily complexes with both the acrylic polymers, and the resin in the instant composition to form water insensitive, impervious coating. The composition of the present invention should include just sufficient zinc salt to provide a zinc content to give the desired drying and film insolubilization properties. The zinc also effects the dry time of the coating of the present invention. If insufficient zinc is present the coating will take too long to dry and will be too water sensitive. The zinc also provides the alkaline removability of the instant composition. At a neutral pH the zinc forms temporary cross-links with the acid functionality in the polymer and resin forming a water insensitive coating. At highly alkaline pH's these zinc cross-links are broken resolubilizing the resins. In amounts above 0.25% the stability of the liquid composition is reduced.

As noted above, the compositions of the present invention are primarily aqueous based, and include a substantial percentage of water, i.e. from about 35 to 55% water. Substantially any water can be utilized, including tap water, deionized water, and the like. As the compositions of the present invention are not particularly sensitive to cations, ordinary tap water can be utilized.

The instant composition can be prepared by ball milling the molybendum disulfide, along with the low molecular weight resin, and water. This disperses and stabilizes the pigments. This aqueous molybendum disulfide resin mixture should be ball milled for from between 4 to 8 hours. At this time the ball milled molybendum disulfide is added to the wax emulsion while continuously mixing. After the molybendum disulfide mixture is added, then the high molecular weight acrylic polymer is added, and the coalescing solvent and soluble zinc salt are added last with aggitation. This aqueous composition is remarkably stable on storage, with little, if no, separation of the molybendum disulfide lubricant.

The compositions of the present invention are utilized by applying a thin coating of the composition on sheet steel immediately prior to the steel being fed to the cupper in a drawing and ironing process. The compositions can be applied either by roll coating or by printing to provide an appropriate film thickness to provide sufficient lubricating properties. It has been found that films which provide a molybendum disulfide coating within the range of from about 20 to 40 milligrams of molybendum disulfide per square foot of steel sheet function best.

In addition to the above components, the composition of the present invention can also include small, minor amounts of other optional ingredients so long as these materials do not interfere with the present composition. These other components include corrosion inhibitors, bactericides, preservatives, and the like.

The composition of the present invention will now be illustrated by way of the following example, wherein all parts and percentages are by weight, and all temperatures are in degrees Celcius.

EXAMPLE

A wax emulsion was prepared, comprising 0.4% triethanolamine, 0.2% of a 37% solution of formaldehyde, 0.1% of a 10 mole aqueous solution of sodium borate, 0.7% coconut diethanolamide, 1.1% stearic acid, 1.0% of a synthetic sperm oil, 81.06% water, 12.04% of a synthetic wax (Smithwax 117) 0.4% boric acid, and 3% pentherythritol monostearate. This material was combined to form an aqueous wax emulsion.

Some 29.6% of molybendum disulfide, suspension grade, is ball milled with 14.8% of a 35% non-volatile aqueous resin solution of 29% styrene, 31% acrylic acid, and 37% alpha-methyl styrene, and 29.6% water. The molybendum disulfide resin and water are ball milled for from 4 to 8 hours, until the molybendum is dispersed and stabilized. This mixture is then added to 14.8% aqueous wax emulsion by slowing adding the molybendum suspension with mixing. After this mixture has been formed, 10% of a 35% non-volatiles composition of a high molecular weight resin having 12% alpha-methyl styrene, 35% styrene, 7% methyl methacrylate, 33% butyl acrylate, and 13% methacrylic acid is added with mixing. At this time, 2% diethylene glycol monobutyl ether is added, along with 1% of a 15% aqueous solution of zinc ammonium carbonate. This material is mixed to form a stable molybendum disulfide dispersion.

The composition was then printed on sheet steel, which is subsequently drawn and ironed into beverage containers.

What I claim is:

1. An improved, sacrificial aqueous coating composition for use in drawing and ironing steel containers comprising:
   (a) from about 10 to 35% by weight molybendum disulfide;
   (b) from about 4 to 7% by weight of a low molecular weight resin having a monomer content of from about 25 to 35% acrylic acid, and from about 65 to 75% of a styrene monomer selected from the group consisting of styrene, alpha-methyl styrene, and mixtures thereof;
   (c) from about 10 to 25% by weight of an aqueous wax emulsion containing from about 15 to 25% non-volatiles;
   (d) from about 3 to 7% by weight of a high molecular weight acrylic polymer comprising from about 25 to 60% of a styrene monomer selected from the group consisting of styrene, alpha-methyl styrene and mixtures thereof, from about 30 to 50% by weight of an ester selected from methyl methacrylate, methyl acrylate, ethyl acrylate, ethyl methacrylate, butyl acrylate and mixtures thereof, and from about 10 to 25% of an acid selected from the group consisting of acrylic acid and methacrylic acid;
   (e) from about 1 to 5% by weight of a solvent selected from the group consisting of diethylene glycol monoethyl ether, diethylene glycol monobutyl ether, dipropylene glycol monomethyl ether, dipropylene glycol monoethyl ether and mixtures thereof;
   (f) from about 0.1 to 0.25% by weight of a water soluble zinc containing salt, and
   (g) from about 35 to 55% by weight water.

2. The coating composition of claim 1, wherein the low molecular weight resin has a number average molecular weight of from 2,500 to 5,000.

3. The composition of claim 2, wherein the low molecular weight resin has a monomer content of from 25 to 35% acrylic acid, from 25 to 35% styrene, and 35 to 45% alpha-methyl styrene.

* * * * *